United States Patent [19]

Weisbecker

[11] 3,728,686

[45] Apr. 17, 1973

[54] COMPUTER MEMORY WITH IMPROVED NEXT WORD ACCESSING

[75] Inventor: Joseph A. Weisbecker, Cherry Hill, N.J.

[73] Assignee: RCA Corporation, New York, N.Y.

[22] Filed: June 7, 1971

[21] Appl. No.: 150,437

[52] U.S. Cl. ....................340/172.5

[51] Int. Cl. ....................G06f 9/16

[58] Field of Search ....................340/172.5

[56] References Cited

UNITED STATES PATENTS

| | | | |
|---|---|---|---|
| 3,521,237 | 7/1970 | Chinlund | 340/172.5 |
| 3,408,630 | 10/1968 | Packard | 340/172.5 |
| 3,234,523 | 2/1966 | Blixt | 340/172.5 |
| 3,380,025 | 4/1968 | Ragland | 340/172.5 |
| 3,325,785 | 6/1967 | Stevens | 340/172.5 |
| 3,570,006 | 3/1971 | Hoff | 340/172.5 |

*Primary Examiner*—Paul J. Henon
*Assistant Examiner*—Sydney R. Chirlin
*Attorney*—H. Christoffersen

[57] ABSTRACT

A computer elementary operation (EO) control memory has memory word storage locations each containing a plurality of EO words. Each EO word contains an operation code, memory word address bits of a next memory word to be accessed, and information identifying a particular EO word in the next memory word. Each EO word which contains a conditional branch operation code includes information identifying an alternate EO word in the next memory word, to be utilized in dependence on a machine condition then existing. The memory word address bits in an EO register are used to read a next memory word from the memory to a memory word data register. Concurrently therewith, the operation code present in the EO register is decoded and used to test a machine condition, and thereafter transfer the selected original or alternate next EO word from the memory word data register to the EO register.

2 Claims, 1 Drawing Figure

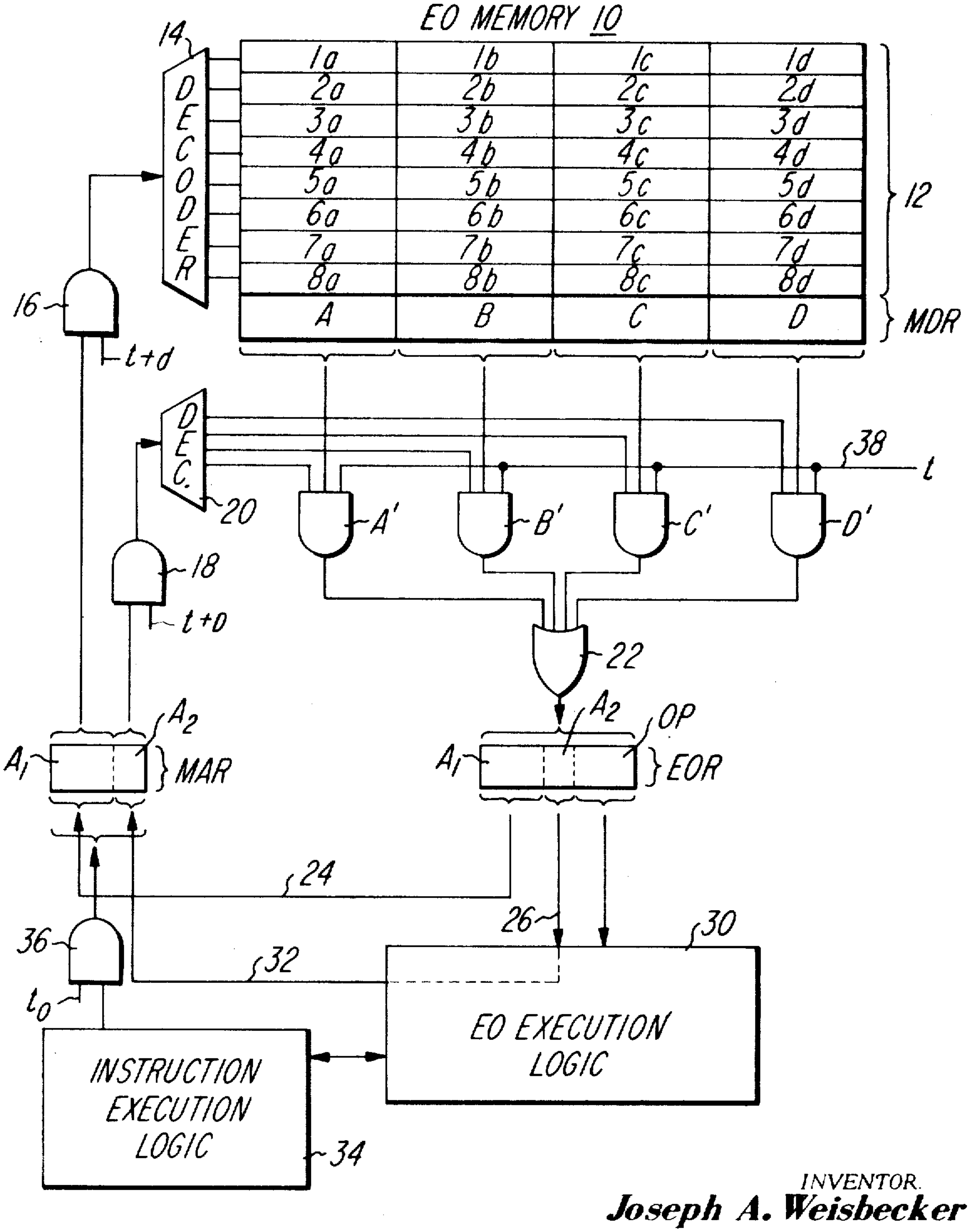
INVENTOR.
Joseph A. Weisbecker
BY Carl V. Olson
ATTORNEY

COMPUTER MEMORY WITH IMPROVED NEXT WORD ACCESSING

BACKGROUND OF THE INVENTION

Computer central processors of the micro-programmed type include a small, fast, control memory for storing microorders or elementary operations (EO's). The execution of each program instruction is initiated by accessing a first EO word from the EO memory, and executing the EO. Each EO word includes the address of the next EO word to be accessed and executed. Any necessary number of EO words are thus sequentially accessed and executed to accomplish the execution of a corresponding instruction. In addition to a next EO word address, each EO word contains an operation code. In some cases, the operation code calls for the testing of a condition in the computer and a conditional branching to an alternate next EO word. The testing of a machine condition may require an appreciable amount of time, particularly when the test point is electrically distant in the computer, and when the test must await the completion of some computation or comparison.

The accessing of a next EO word from the EO memory also takes an appreciable amount of time. Therefore, it is customary to initiate the accessing of the next EO word as soon as possible. However, when a conditional branch EO is being executed, the particular next EO is not known until after the specified test has been completed. It is thus necessary to delay the accessing of the next EO word, and to wait for it to be available, before it can be executed. Computer performance can be improved if a way is found to avoid the described delay and waiting times.

SUMMARY OF THE INVENTION

According to an example of the invention, a system is provided in which a memory word includes at least two EO words, and accessing of a next memory word occurs concurrently with a determination of which EO word, present in the next memory word, will be utilized.

BRIEF DESCRIPTION OF THE DRAWING

The sole FIGURE of the drawing is a diagram of the control memory portion of a computer constructed according to the teachings of the invention.

DETAILED DESCRIPTION

Referring in greater detail to the drawing, there is shown an elementary operation (EO) memory 10 including memory word storage locations 12, a memory data register MDR, an address decoder 14, and a memory address register MAR. The memory word storage locations 12 are shown, by way of example, as providing storage locations for eight memory words designated 1 through 8, each including four EO words designated a through d. The number of EO words in each memory word may be more or less than four. The address decoder 14 operates to select or access any desired one of the eight memory word storage locations designated 1 through 8, for the purpose of transferring the contents of the selected memory word location to the memory data register MDR. The memory data register MDR has portions labeled A through D for receiving and storing the four EO words of an accessed memory word. The EO memory 10 is preferably a semiconductor read-only memory having storage locations for hundreds of EO words and having an access time of the order of 100 nanoseconds.

The memory address register MAR is divided into two parts: $A_1$ for high-order address bits, and $A_2$ for low-order address bits. The portion $A_1$ of register MAR is coupled through an "and" gate 16 (representing a plurality of "and" gates) to the input of decoder 14 for accessing any specified one of the eight memory word locations. The portion $A_2$ of register MAR is coupled through an "and" gate 18 to a second decoder 20. The decoder 20 has four outputs each connected to enable a respective "and" gate A' through D'. The gates A' through D' also have inputs from respective portions A through D of the memory data register MDR. The outputs of gates A' through D' are coupled through an "or" gate 22 to an EO register EOR. Register EOR includes a portion $A_1$ for high-order address bits of a next EO word to be accessed from memory 10, a portion $A_2$ for low-order bits of the next address, and a portion OP for an elementary operation code.

The contents of the portion $A_1$ of register EOR are coupled over lines 24 to the corresponding portion $A_1$ of register MAR. The contents of portion $A_2$ of register EOR are coupled over lines 26 to an EO execution logic unit 30. The low-order next address bits, supplied over lines 26 to logic unit 30, may be modified in the logic unit, and are transmitted with or without change over lines 32 to the portion $A_2$ of register MAR. An instruction execution logic unit 34 includes means to supply the address of a first EO word through gate 36 to the memory address register Mar. The logic systems 30 and 34 are known systems included in computers of the micro-programmed type and therefore need not be described in greater detail.

Each of the thirty-two EO words in the memory storage locations 12 includes next address portions $A_1$ and $A_2$ and an operation portion OP, as shown in the EO register EOR. In the simplified example illustrated, the portion $A_1$ includes space for three binary bits by which to address any one of the eight memory word storage locations 1 through 8. The portion $A_2$ includes space for two binary bits for use by means of decoder 20 to enable any one of the four gates A' through B'. The operation code portion OP may include as many bits as are needed to specify elementary operations executed by logic unit 30.

Since each of the 32 EO work locations 12 contains the address of the next EO word to be accessed, sequentially-used EO words need not be in sequential storage locations, but can be anywhere in the memory. However, an EO including a conditional branch operation code should specify alternative next EO's which are all located in the same memory word. This is done so that the memory word containing all possible next EO's can be accessed while a determination of the next EO is made.

OPERATION

In the operation of the system described, the instruction execution logic 34 initially supplies the address of a first elementary operation word through gate 36 to the memory address register MAR at a time designated $t_0$. The portion $A_1$ of the address is applied through gate 16 and decoder 14 to transfer the specified memory word to the memory data register MDR. Then, the portion $A_2$ of the address is applied through gate 18 to decoder 20 to cause the transfer of a specified one of the EO words A through D from the memory data register MDR to the EO register EOR. This last transfer occurs at a time $t$ when a timing signal is applied over line 38 to all of gates A' through D'.

The first EO word needed to execute an instruction is now present at time $t$ in the register EOR. The EO word includes the address of the next EO word needed in the execution of the instruction. The high-order bits $A_1$ of the next address are immediately transferred over lines 24 to portion $A_1$ of memory address register MAR. Then almost immediately, at time $t+d$, the bits are passed by gate 16 to decoder 14 to initiate the accessing of a memory word including the desired next EO word. While the memory accessing is taking place, the operation portion OP of the EO word in register EOR is used by the EO execution logic 30 to perform a specified elementary operation.

The system operates in a cyclic manner with successive timing pulses $t$ defining successive time periods T during which respective successive EO's are executed. A timing pulse $t+d$ is delayed a very short time $d$ relative to a timing pulse $t$, where the delay $d$ is very short compared with the time period T between successive timing pulses$t$. A timing pulse $t+D$ is delayed a relatively long time D following the timing pulse $t$, where the delay D is almost as long as the time period T between successive timing pulses $t$.

The time required to access a particular memory word from memory 10 to the memory data register MDR is roughly comparable to the time required to execute the elementary operation specified by the operation code OP. The memory access is performed concurrently with execution of the operation code, in the time period between $t+d$ and $t+D$. Therefore, the next EO word needed can be very quickly supplied to the EO register without waiting for the time required to accomplish a memory access.

The operation code portion OP of an EO word in register EOR includes information specifying whether the low-order address bits $A_2$ of the next EO address are to be used directly, or whether they are to be changed as a result of tests of machine conditions existing at the conclusion of the execution of the elementary operation code OP. If changes are necessary, they are accomplished in the EO execution logic 30 by time $t+D$, which is just prior to the time when a next EO is needed in the register EOR. At time $t+D$, just prior to the time the next EO word is needed, the low-order address bits $A_2$ are supplied from logic unit 30 through lines 32, portion $A_2$ of register MAR, and gate 18 to decoder 20, to accomplish the transfer of one of the four available EO words from the memory data register MDR to the EO register EOR.

The second EO word then present in the register EOR is handled as has been described, including the procedure of initiating the accessing of the third EO word that will be needed. The procedure is repeated until all the EO's necessary for the execution for the initial instruction have been executed. The EO execution logic 30 then signals the instruction execution logic 34 that the instruction has been executed and that the address of the first EO word of a next following instruction should be supplied to the memory address register MAR.

The time period allocated for the execution of each EO is less than required by prior art arrangements because the next memory word is accessed during the same time period that the operation code is executed and a determination is made as to which EO word in the accessed memory word will be the next EO word to be executed. The time period allocated for the execution of conditional branch EO's may be the same as the time period allocated for the execution of EO's having no uncertainty regarding the address of the next EO. In other words, the same short cycle time can be used for all EO's, and this itself is advantageous. The percentage saving in the execution of a program using the invention depends on the percentage of conditional branch EO's encountered in the program. Since the invention can save almost 100 percent of the time otherwise required to execute one conditional branch EO, a very significant time saving of about 10 percent is achieved of 10 percent of the EO's encountered are conditional branch EO's.

What is claimed is:

1. In a computer, the combination of
an elementary operation (EO) memory having memory word storage locations each containing a plurality of EO words, each EO word containing an operation code, memory word address bits of a next memory word to be accessed, and information identifying a particular EO word in the next memory word, each EO word which contains a conditional branch operation code including information identifying an alternate EO word in the next memory word, to be utilized in dependence on a machine condition then existing,
a memory word data register,
an EO register,
memory accessing means utilizing memory word address bits in said EO register to read a next memory word from said memory to said memory word data register, and
means to execute the operation code present in said EO register, including means to test a machine condition, and thereafter transfer the selected original or alternate next EO word from said memory word data register to said EO register,
whereby a next memory word is accessed concurrently with a determination of which next EO word in the accessed memory word is to be utilized.

2. The combination of
a control memory having memory word storage locations each containing a plurality of control words, each control word including an operation code, memory word address bits of a next memory word to be accessed, and information identifying a particular control word in the next memory word,
a memory word data register,
a control register,
memory accessing means utilizing memory word address bits in said control register to read a next memory word from said memory to said memory word data register, and means concurrently to execute the operation code present in said control register, and thereafter transfer solely a selected one of the control words in said memory word data register to said control register.

* * * * *